United States Patent
You

(10) Patent No.: US 10,622,818 B2
(45) Date of Patent: Apr. 14, 2020

(54) CHARGER

(71) Applicant: Hongping You, Yancheng (CN)

(72) Inventor: Hongping You, Yancheng (CN)

(*) Notice: Subject to any disclaimer, the term of this patent is extended or adjusted under 35 U.S.C. 154(b) by 389 days.

(21) Appl. No.: 15/607,444

(22) Filed: May 27, 2017

(65) Prior Publication Data

US 2018/0136265 A1    May 17, 2018

(30) Foreign Application Priority Data

Nov. 15, 2016  (CN) .......................... 2016 1 1002453

(51) Int. Cl.
| | |
|---|---|
| *G01R 21/06* | (2006.01) |
| *H02J 7/00* | (2006.01) |
| *H02H 7/22* | (2006.01) |
| *H02J 7/02* | (2016.01) |

(52) U.S. Cl.
CPC .......... *H02J 7/0026* (2013.01); *H02H 7/226* (2013.01); *H02J 7/027* (2013.01)

(58) Field of Classification Search
CPC ............... G01R 19/00; G01R 19/0007; G01R 29/0814; G01R 29/0842; G01R 31/2642
See application file for complete search history.

(56) References Cited

U.S. PATENT DOCUMENTS

| | | | | |
|---|---|---|---|---|
| 4,388,583 | A * | 6/1983 | Krueger | H01M 10/44 310/311 |
| 6,133,711 | A * | 10/2000 | Hayashi | G01R 31/3648 320/106 |
| 2016/0359350 | A1 * | 12/2016 | Uesugi | H02J 7/0044 |

* cited by examiner

*Primary Examiner* — Tung X Nguyen

(57) ABSTRACT

The invention relates to a charger, comprising an AC plug and a wire terminals, said AC plug being connected to a high voltage AC and supplying power to the device through a terminal, wherein said terminal is provided with a two-phase AC electrical wiring probe, a DC electrical connection probe and a data line probe; said AC wire probe is connected with a null wire or a live wire through a relay; said DC wire probe is connected with AC through a transformer; said terminal is further provided with a controller; said controller is connected with the sensor to control the connection and disconnection of the relay; the terminal of the electrical equipment is provided with the corresponding probe hole; AC is supplied for equipment while DC is for the internal control components; data line is used for the data communication transmission between electric equipment and the terminal.

1 Claim, 2 Drawing Sheets

CHARGER

FIELD OF THE INVENTION

The present invention relates to a charger, particularly a kind of high voltage AC charger.

DESCRIPTION OF PRIOR ART

In the prior art, the input terminal and output terminal of many high voltage AC wires are 220V high voltage which causes a feeling of high-risk. For this high voltage AC wires, the output terminal is dangerous after the input terminal is plugged in power source that most people can not touch; when the output terminal is plugged in the electrical equipment, there will be a phenomenon of ignition during the moment of instant connection with the power equipment which also brings a high risk. At present, a very good solution for the AC electric equipment has not yet been provided.

SUMMARY OF THE INVENTION

The purpose of the present invention is to provide a charger that when the input terminal is plugged in power source, there is n current at the output terminal if the electric equipment is not plugged in the corresponding to the terminal.

In order to achieve the purpose above-mentioned, the present invention is described like this: a charger comprising an AC plug and a wire terminal, said AC plug being connected to a high voltage AC and supplying power to the device through a terminal, wherein said terminal is provided with a two-phase AC electrical wiring probe, a DC electrical connection probe and a data line probe; said AC wire probe is connected with a null wire or a live wire through a relay; said DC wire probe is connected with AC through a transformer; said terminal is further provided with a controller; said controller is connected with the sensor to control the connection and disconnection of the relay; in the terminal of the electrical equipment is provided with the corresponding probe hole; AC is supplied for equipment while DC is supplied for the internal control components; data line is used for the data communication transmission between electric equipment and the terminal.

The present technical solution adopts the simultaneous output of AC and DC, uses the DC to control the connection between the power supply unit and the coupling end of the connection line and at the same time sets up the data connection, which improves the security of the connection, that is, only when the DC is connected meanwhile the data line probe is also connected, the AC is connected, so that the safety performance of this two-phase power source is increased.

Further, a signal processor, a battery and a control circuit are provided in the electric equipment; said battery is supplied for the control circuit and the signal processor; the battery is charged by a DC. A temperature indicator is provided on the control circuit. Said terminals has five probes, two of which at both ends are two-phase electric probes; the middle one is the data line probe and the other two are the DC charging probes.

The above improvement is suitable for the heating plate, said electric equipment is a heating device, in which is provided with a temperature sensor; said temperature sensor sends the signal to the signal processor, and the control circuit communicates with the controller through the data line probe to control the connection and disconnection of the relay. A super capacitor is provided in the electric equipment; said super capacitor is powered by DC, and the output end of the super capacitor is connected with the heating plate for discharge and heat preservation.

For this invention, on one hand the heating plate is heated by AC that the heating speed is fast, on the other hand the DC battery in the electric equipment can control the temperature of the heating plate by stopping heating after reaching to the specified temperature, in addition that the DC inside can also be supplied for the super capacitor.

DETAILED DESCRIPTION OF SOME EMBODIMENTS

Figure 1:
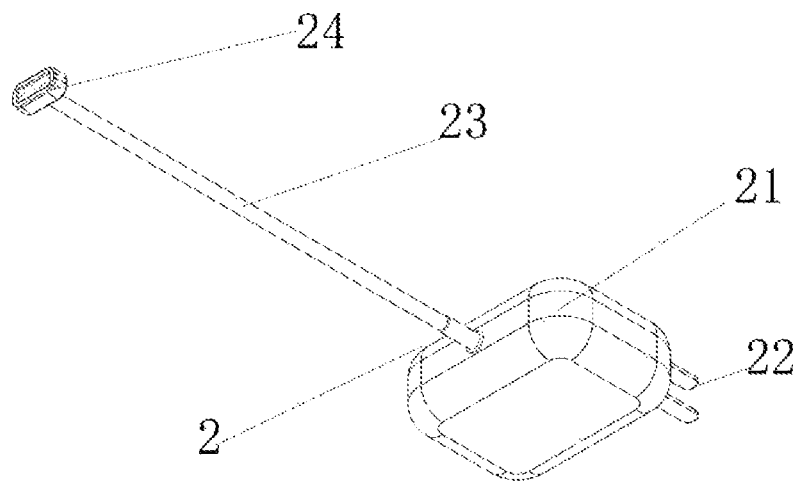
FIG. 1 is the schematic diagram of the connection wires of the present invention.
Figure 2:
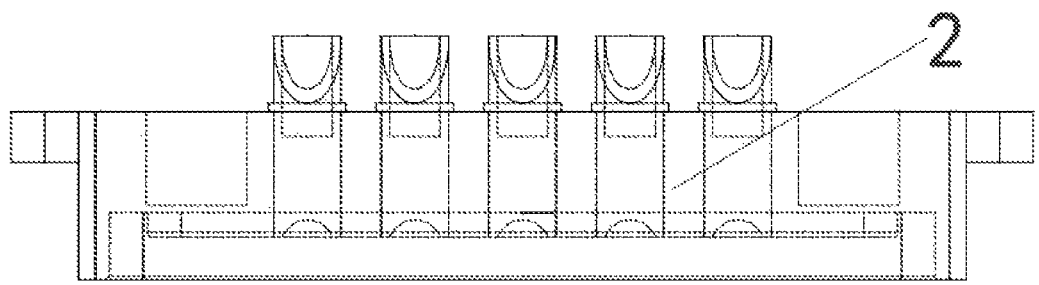
FIG. 2 is the schematic diagram of the coupling terminal of the wire terminal.
Figure 3:
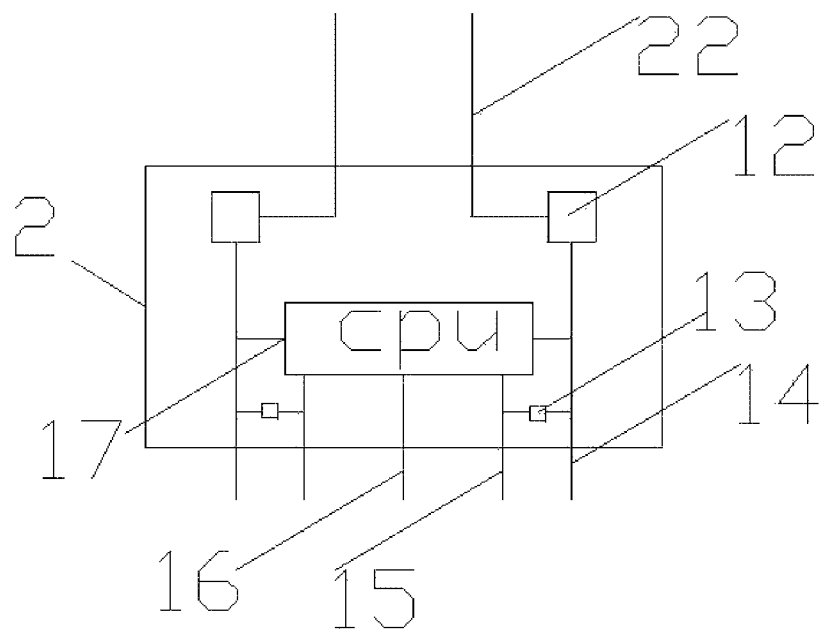
FIG. 3 is the schematic diagram of the interior structure of the wire terminal.
Figure 4:
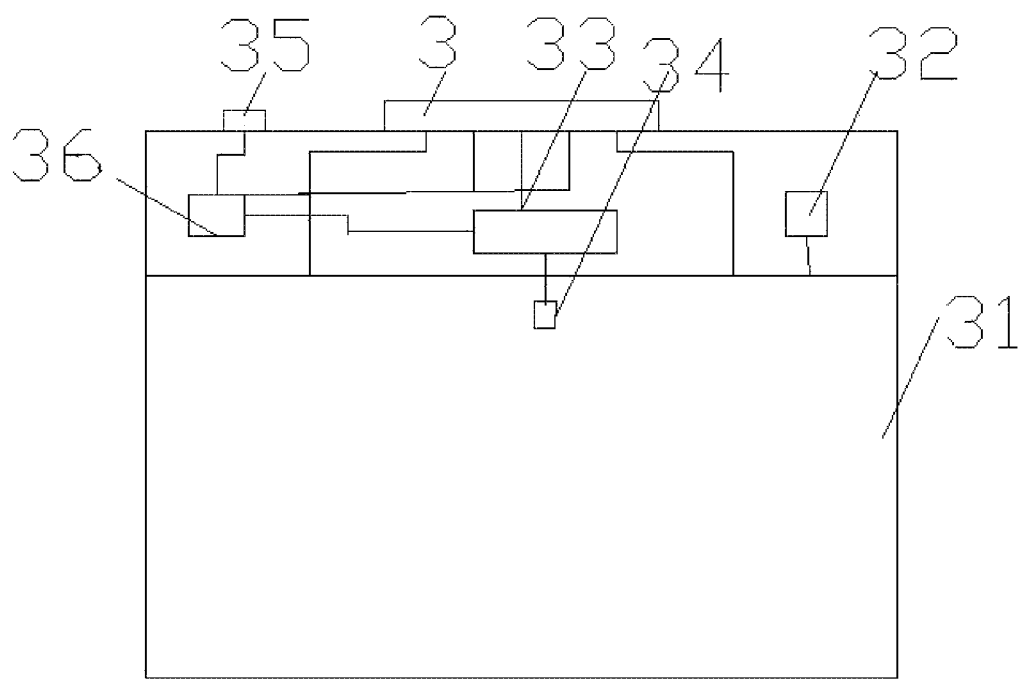
FIG. 4 is the schematic diagram of power supply unit.

The invention will be described in further details with reference of the drawings.

Embodiment 1

A charger comprising an AC plug 22 and a wire terminal 2, said AC plug 22 being connected to a high voltage AC and supplying power to the device through a terminal 2; said terminal is provided with a two-phase AC electrical wiring probe 14, a DC electrical connection probe 15 and a data line probe 16; said AC electrical wiring probe, DC electrical connection probe and data line probe are lined up; the AC plug has two probes at both ends; two DC probes are arranged closely to the AC probes; the middle one is the data line probe and the other two are the DC charging probes; said AC wire probe is connected with a null wire or a live wire through a relay 12; said DC wire probe is connected with AC through a transformer 13; said terminal is further provided with a controller 17; said controller is connected with the sensor to control the connection and disconnection of the relay according to the information sent by data line probe; the above equipment can be connected with a extension cord for electric current connection; the terminal of the extension cord can be connected with a wire termination. In the terminal of the electrical equipment is provided with the corresponding probe hole; AC is supplied for equipment while DC is supplied for the internal control components; data line is used for the data transmission between electric equipment and the terminal. A corresponding controller is provided in the equipment to send signals to the controller in the wire terminal through the data line probe to make the controller switch on the relay to connect through the high voltage line.

Embodiment 2

In this present embodiment, a heating plate is used in the electric equipment 3. On the basis of the original heating plate 3, the wire terminal is changed from the original AC power to the five-probe jack corresponding to the wire terminal; two ends of which are AC, followed by DC, middle one the data line probe connecting its own controller 33 which sends information to the controller in wire terminal after receiving the signals to inform the controller to switch on the relay then to connect the power source to heat the heating plate which is provided with a temperature sensor 34 inside; the temperature sensor is also connected with the controller to control temperature; the heating will be stopped when the setting temperature is reached. What is more convenient, the shell can also be provided with an indicator light 35, controlled by the controller according to the temperature, the light glows in different colors, thus indicating the temperature of the heating plate.

Embodiment 3

For further control of the temperature and supply power for the AC meanwhile charging for the equipment, a super capacitor 32 is provided in the power supply unit, which can supply power for AC and charge for the capacitor; the capacitor can continue heating the heating plate according to the change of temperature after being unplugged from the power source; if the electrical parts in the electronic equipment want to be on work after unplugging the power source, a DC battery 36 must be installed in the electronic equipment. When the power is supplied to the battery 36, the battery 36 is also charged with the DC power supply, and then the power can be supplied to the controller, the indicator light, the sensor, and other parts after unplugging the power source.

What is claimed is:

1. A charger comprising an AC plug and a wire terminals, said AC plug being connected to a high voltage AC and supplying power to the device through a terminal, wherein said terminal is provided with a two-phase AC electrical wiring probe, a DC electrical connection probe and a data line probe; said AC wire probe is connected with a null wire or a live wire through a relay; said DC wire probe is connected with AC through a transformer; said terminal is further provided with a controller; said controller is connected with the sensor to control the connection and disconnection of the relay; in the terminal of the electrical equipment is provided with the corresponding probe hole; AC is supplied for equipment while DC is supplied for the internal control components; data line is used for the data communication transmission between electric equipment and the terminal, wherein a signal processor, a battery and a control circuit are provided in the electric equipment; said battery is supplied for the control circuit and the signal processor; the battery is charged by a DC, wherein said terminals has five probes, two of which at both ends are two-phase electric probes; the middle one is the data line probe and the other two are the DC charging probes, wherein said electric equipment is a heating device, in which is provided with a temperature sensor; said temperature sensor sends the signal to the signal processor, and the control circuit communicates with the controller through the data line probe to control the connection and disconnection of the relay, wherein a DC capacitor is provided in the electric equipment; said DC capacitor is powered by DC, and the output end of the DC capacitor is connected with the heating plate for discharge and heat preservation.

* * * * *